United States Patent
Michael et al.

(10) Patent No.: US 7,722,714 B2
(45) Date of Patent: May 25, 2010

(54) FUMED SILICA DISPERSION

(75) Inventors: Günther Michael, Karlstein (DE); Jürgen Meyer, Stockstadt (DE); Thorsten Ladwig, Hainburg (DE); Pedro Cavaleiro, Viersen (DE)

(73) Assignee: Evonik Degussa GmbH (DE)

( * ) Notice: Subject to any disclaimer, the term of this patent is extended or adjusted under 35 U.S.C. 154(b) by 0 days.

(21) Appl. No.: 12/299,081

(22) PCT Filed: Apr. 5, 2007

(86) PCT No.: PCT/EP2007/053370

§ 371 (c)(1), (2), (4) Date: Oct. 30, 2008

(87) PCT Pub. No.: WO2007/128636

PCT Pub. Date: Nov. 15, 2007

(65) Prior Publication Data

US 2009/0120328 A1   May 14, 2009

(30) Foreign Application Priority Data

May 4, 2006   (DE) .................. 10 2006 020 987

(51) Int. Cl.
*C09C 1/30* (2006.01)
*C09D 7/00* (2006.01)

(52) U.S. Cl. ............ 106/490; 106/287.13; 106/287.14; 106/287.15; 106/287.24; 106/491; 428/403; 428/404; 524/492

(58) Field of Classification Search ................ 106/491, 106/287.34, 287.13, 287.14, 287.15, 481, 106/490; 428/403, 404; 524/492
See application file for complete search history.

(56) References Cited

U.S. PATENT DOCUMENTS

2004/0077768 A1   4/2004   Greenwood
2004/0097600 A1*  5/2004   Greenwood et al. ........... 516/86

FOREIGN PATENT DOCUMENTS

| GB | 916 998 A | 1/1963 |
| WO | 2004/020532 A | 3/2004 |
| WO | 2004/020536 A | 3/2004 |

OTHER PUBLICATIONS

International Search Report and Written Opinion (PCT/EP2007/053370), [Nov. 30, 2007].

* cited by examiner

*Primary Examiner*—Anthony J Green
(74) *Attorney, Agent, or Firm*—Smith, Gambrell & Russell, LLP

(57) ABSTRACT

Dispersion of fumed silica comprising a silanized, structurally modified silica and a solvent. It is used for producing coating materials.

11 Claims, 5 Drawing Sheets

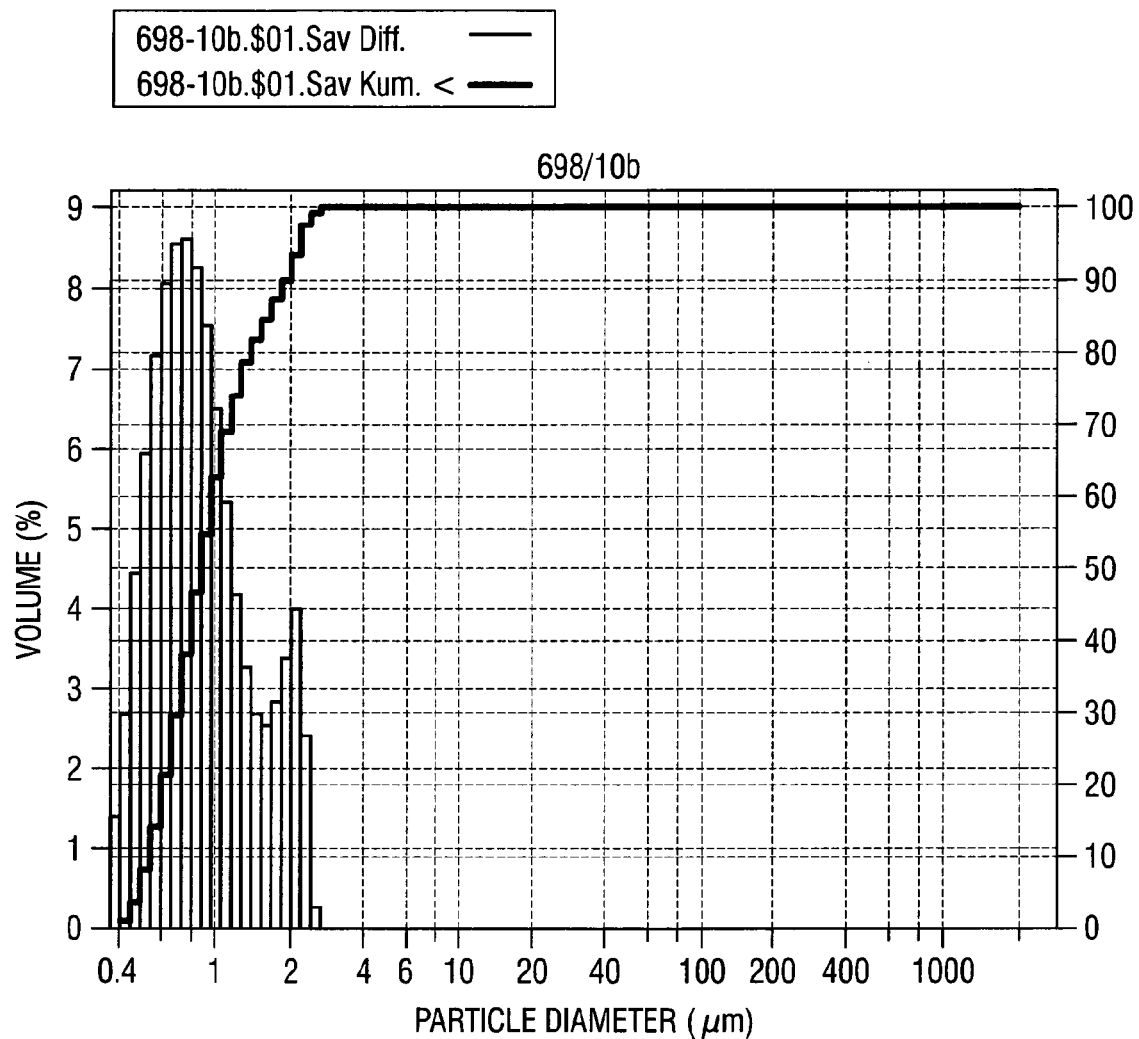
Fig. 1: Example 1, Coating material

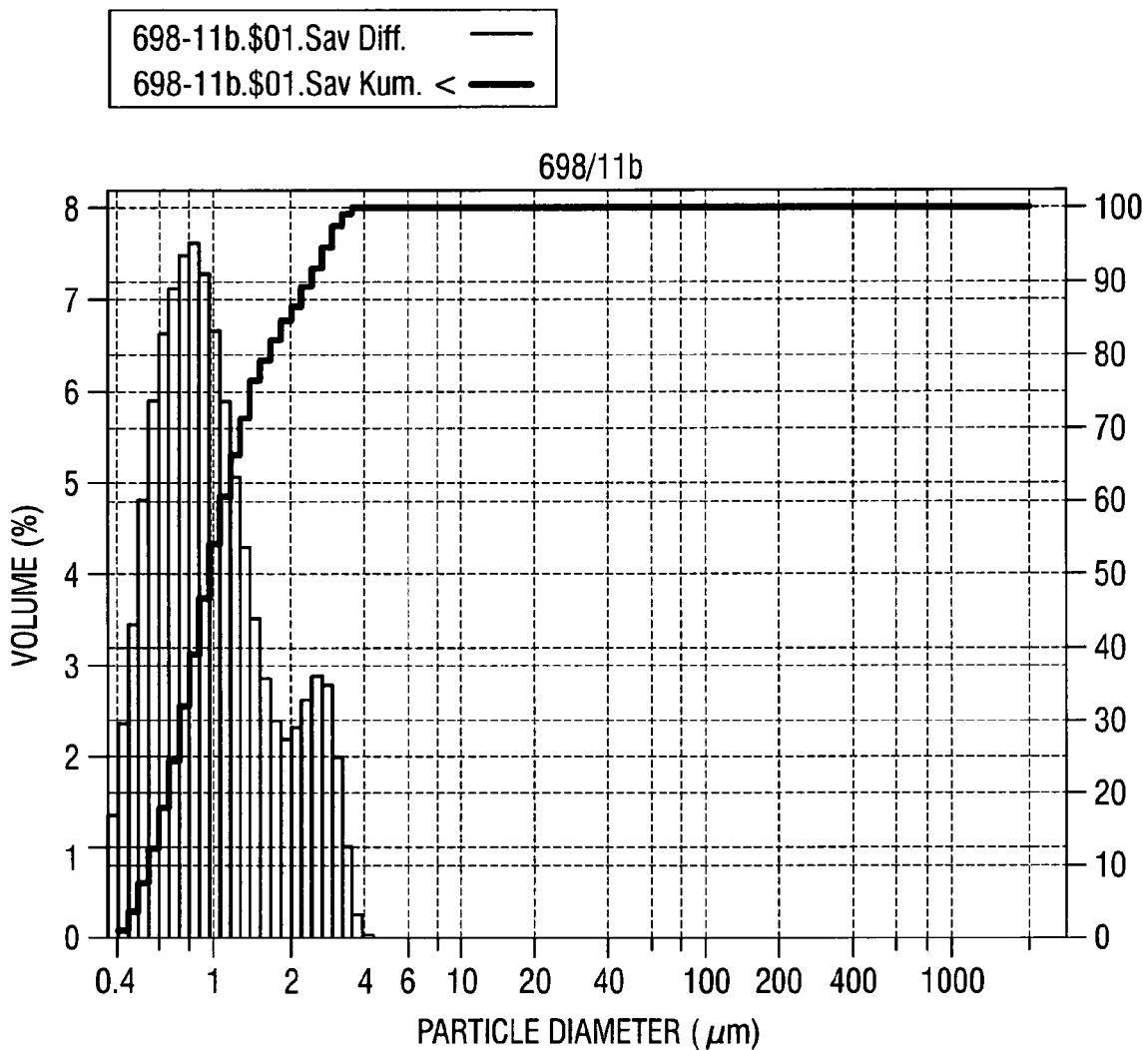
Fig. 2: Example 2, Coating material

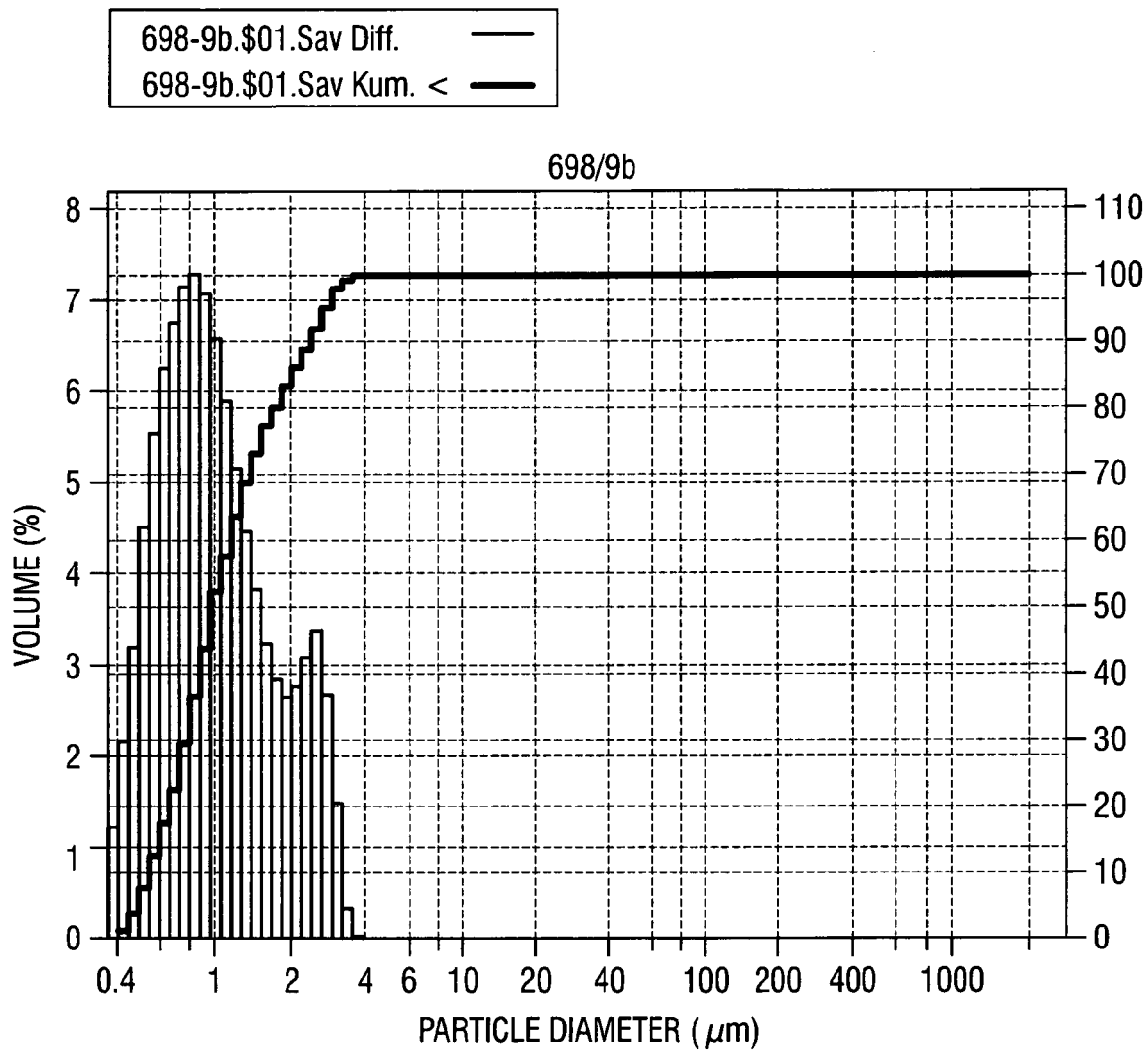
Fig. 3: Example 3, Coating material

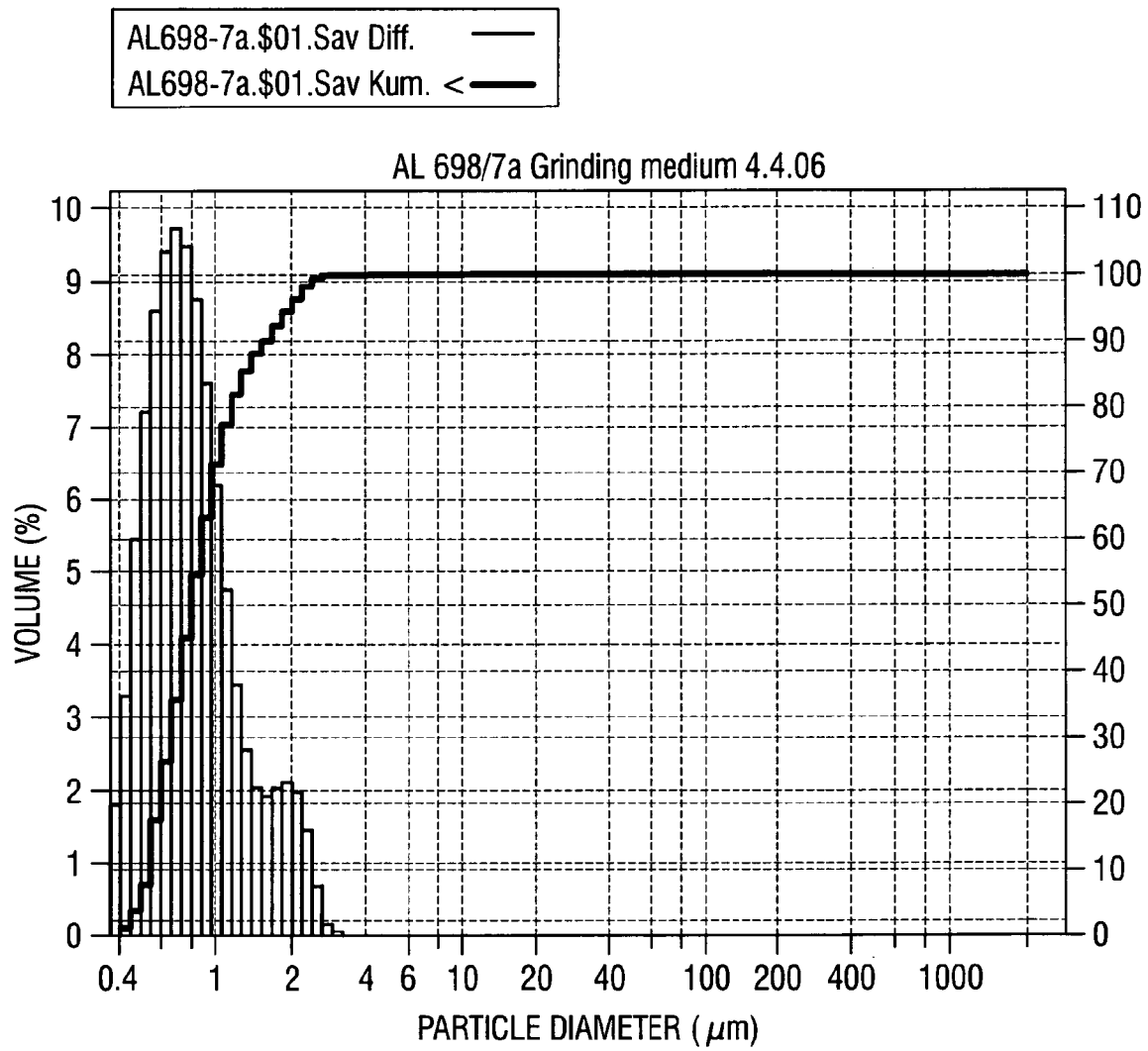
Fig. 4: Example 4, Grinding medium

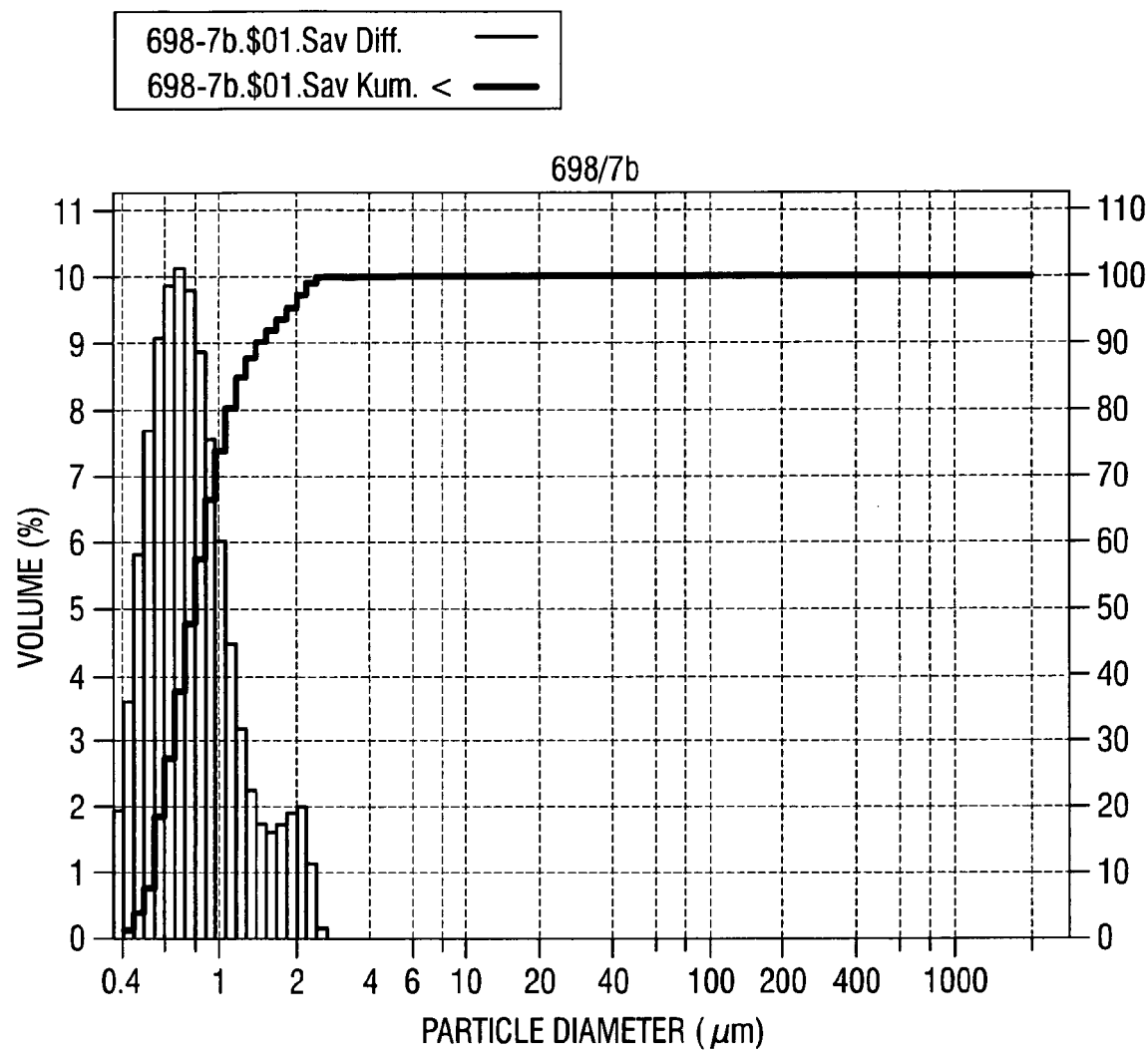
Fig. 5: Example 4, Coating material

FUMED SILICA DISPERSION

INTRODUCTION AND BACKGROUND

The invention relates to a dispersion of fumed silica and to its use for producing coating materials.

The incorporation of fumed silica into coating materials is known. From the document Schriftenreihe Pigmente No. 18 (April 1980) page 5, the incorporation of hydrophobic fumed silica (Aerosil® 972), together with pigments and fillers, is known. To produce a clearcoat material, for instance, the preparation is recommended of an approximately 10% paste in the respective binder solution, for which it is possible to use the typical dispersing equipment. The paste prepared in this way is used as a grinding medium for the further steps for producing the coating material.

Also known is the incorporation into coating materials of silanized, structurally modified fumed silica, the binder being mixed with solvent, and the silica being mixed in to this mixture using a high-speed mixer. The resulting mixture is subsequently dispersed using a bead mill (WO 2004/020532).

The known methods of incorporating fumed silica into the coating system have the disadvantage that the clearcoat materials produced in this way exhibit unwanted haze and/or unwanted frosting.

SUMMARY OF THE INVENTION

An object which existed, therefore, was to develop a process with which the fumed silica can be incorporated into coating systems in such a way that it is possible to avoid frosting.

The invention provides a dispersion of fumed silica which is characterized in that it comprises a silanized, structurally modified silica and a solvent.

In one embodiment of the invention the dispersion may further comprise additives. Examples of possible such additives include curing agents.

The silanized, structurally modified silica may in one preferred embodiment of the invention be a fumed silica. The silica may be present in an amount of 5% to 60% by weight, based on the dispersion. With preference the solids content may amount to 20% to 40% by weight. The silanized, structurally modified, fumed silica is known from WO 2004/020532.

The silanized, structurally modified fumed silica may have dimethylsilyl and/or monomethylsilyl groups, preferably dimethylsilyl groups, on the surface.

The silica useful in accordance with the invention may have the following physicochemical parameters:

| | |
|---|---|
| BET surface area m$^2$/g: | 25-400 |
| Average primary particle size nm: | 5-50 |
| pH: | 3-10 |
| Carbon content % by weight: | 0.1-10 |
| DBP value %: | <200 |

The silanized, structurally modified silica useful in accordance with the invention may be prepared by surface-modifying a fumed silica with dimethyldichlorosilane and/or monomethylsilane and structurally modifying the surface-modified silica.

The silanized, structurally modified, fumed silica used may in one preferred embodiment of the invention be a silica that has been prepared from a fumed silica having a BET surface area of 200±25 m$^2$/g that has been silanized with dimethyldichlorosilane and then structurally modified in accordance with WO 2004/020532. This fumed silica is known in the form of Aerosil® R9200.

In one preferred embodiment of the invention the dispersion may have the following size distribution of the particles of fumed, silanized, structurally modified silica:

20% to 98% by weight in the range from 0.01 µm to 1.5 µm
2% to 80% by weight in the range from 1.5 µm to 4.0 µm.

In particular the particle size distribution may be as follows:

60% to 95% by weight in the range from 0.2 µm to 1.5 µm
5% to 40% by weight in the range from 1.5 µm to 3.5 µm.

The dispersion of the invention may contain the silica in an amount of 5% to 70% by weight, preferably in an amount of 20% to 40% by weight.

The dispersion of the invention may be prepared by mixing and dispersing the silanized, structurally modified, fumed silica with the solvent.

In one embodiment of the invention the dispersing can be carried out by means of a bead mill.

Solvents which can be employed include organic solvents.

It is possible in particular to use solvents from the group n-hexane, n-heptane, cyclohexane, toluene, xylene, ethylbenzene, cumene, styrene, dichloromethane, 1,2-dichloroethane, methanol, ethanol, 1-propanol, 2-propanol, 1-butanol, isobutanol, 2-ethylhexanol, cyclohexanol, diacetone alcohol, acetone, methyl ethyl ketone, methyl isobutyl ketone, diisobutyl ketone, cyclohexanone, mesityl oxide, isophorone, methyl acetate, ethyl acetate, butyl acetate, isobutyl acetate, methylglycol acetate, butylglycol acetate, ethyldiglycol acetate, butyldiglycol acetate, methoxypropyl acetate, ethoxypropyl acetate, ethylene carbonate, propylene carbonate, diethyl ether, methyl tert-butyl ether, tetrahydrofuran, dioxane, ethylglycol, propylglycol, butylglycol, ethyldiglycol, butyldiglycol, 1-methoxy-2-propanol, 1-ethoxy-2-propanol, 1-isopropoxy-2-propanol, 1-isobutoxy-2-propanol, methyldipropylene glycol, dimethylformamide, dimethylacetamide, dimethyl sulphoxide, carbon disulphide, 1-nitropentane, 2-nitropentane, nitrobenzene or N-methyl-2-pyrrolidone, individually or in a mixture.

The invention further provides a process for preparing solventborne coating materials, which is characterized in that the inventive dispersion of a fumed silica is mixed and dispersed with at least one curing agent and/or at least one binder.

In one embodiment of the invention the dispersing can be carried out by means of a bead mill.

Water-soluble coating materials are excluded in accordance with the invention.

The invention has the advantage that a relatively low level of frosting is found in the clearcoat material.

Furthermore, owing to the relatively high concentration of silica in the dispersion, the volume of clearcoat material produced is substantially higher.

EXAMPLES

In Examples 1 to 3 the silanized, structurally modified fumed silica Aerosil® R9200 is incorporated by means of the known methods into a clearcoat system. According to Example 4 the silanized, structurally modified fumed silica is incorporated by means of the dispersion of the invention.

It is found that the inventively prepared clearcoat material has less frosting and also a very good coating-material homogeneity.

BRIEF DESCRIPTION OF DRAWINGS

The present invention will be further understood with reference to the accompanying drawings, wherein:

FIGS. 1, 2, 3, 4 and 5 show the particle diameters of the silica particles present in the coating material.

DETAILED DESCRIPTION OF INVENTION

For instance, in accordance with Examples 1, 2 and 3, 77% to 85% by weight of the particles are between 0.4 μm and 1.5 μm, while 15% to 23% by weight are between 1.5 μm and 4 μm.

In accordance with inventive Example 4, the coating material has a substantially lower coarse fraction. Thus 90% by weight of the particles are in the range from 0.4 to 1.5 μm and only 15% by weight of the particles are between 1.5 and 2.9 μm.

This means that the fraction of particles smaller than 2.9 μm, which are responsible for the haze and/or for the frosting, is significantly lower.

| Example | 1 | 2 | 3 | 4 |
|---|---|---|---|---|
| Grinding medium | x4 | x4 | x4 | |
| Macrynal SM 565 [g] | 244 | 244 | 244 | 0 |
| Methoxypropyl acetate [g] | 42 | 42 | 42 | 240 |
| Butyl acetate [g] | 6 | 6 | 6 | 0 |
| Solvesso 100 [g] | 8 | 8 | 8 | 0 |
| Xylene [g] | 10.8 | 10.8 | 10.8 | 0 |
| LA-D 1045 [g] | 0 | 0 | 1.5 | 9 |
| Dispers 652 [g] | 0 | 3 | 1.5 | 9 |
| AEROSIL R 9200 [g] | 20 | 20 | 20 | 117 |
| Total [g] | 330.8 | 333.8 | 333.8 | 375 |
| Dispersing | BM | BM | BM | BM |
| Revolutions per minute | 3000 | 3000 | 3000 | 3000 |
| Dispersing time [minutes] | 60 | 60 | 60 | 60 |
| Power [W] | 220 | 230 | 250 | 160 |
| Temperature [° C.] | 42 | 42 | 42 | 25 |
| Viscosity 0.1 1/s [mPa s] | — | — | — | 315 |
| Grindometer [μm] | | | | <10 |
| Coulter d 50 [μm]*** | — | — | — | 0.757 |
| Coulter d 95 [μm]*** | — | — | — | 1.948 |
| Millbase | | | | x2 |
| Macrynal SM 565 [g] | — | — | — | 122 |
| Grinding medium [g] | — | — | — | 32 |
| MPA [g] | | | | 0.5 |
| Butyl acetate [g] | | | | 3 |
| Solvesso 100 [g] | | | | 4 |
| Xylene [g] | | | | 5.4 |
| Total [g] | | | | 166.9 |
| Viscosity 0.1 1/s [mPa s] | 670 | 440 | 300 | 315 |
| Grindometer [μm] | <10 | <10 | <10 | <10 |
| Coulter d 50 [μm]*** | 0.821 | 0.911 | 0.938 | 0.736 |
| Coulter d 95 [μm]*** | 0.911 | 2.749 | 2.631 | 1.844 |
| Letdown | | | | |
| Grinding medium/ millbase | 82.7 | 83.45 | 83.45 | 83.45 |
| Curing agent | 22.3 | 22.3 | 22.3 | 22.3 |
| 20° gloss | 82.3 | 83.5 | 81.6 | 82.1 |
| Haze | 8 | 8 | 6 | 6 |
| Black number MY**** | 268 | 270 | 270 | 270 |
| Hue contribution dM**** | 15 | 12.5 | 14 | 13.6 |

| Example | 1 | 2 | 3 | 4 |
|---|---|---|---|---|
| Flow | good | poor | good | good |
| Scratch resistance compared to AEROSIL ®-free formulation, Elcometer 1720** | good | somewhat better | good | good |
| Visual assessment of coating-material homogeneity | good | severe agglomeration | good | very good |

LA-D 1045: Dispersing additive from Tego
Dispers 652: Dispersing additive from Tego
Macrynal SM 565: Acrylic copolymer from Surface Specialties, USB
Solvesso 100: Aromatics mixture from Imperial Oil
BM: Dispermat SL 5 from Getzmann
*Grindometer 30 μm means coating material unusable
**Technical Information No. 1284, Degussa AG
***The samples were measured by means of laser diffraction in a Coulter LS230 Micro Volume module. This was done by introducing the pure varnish system or the solvent as the measurement medium and adding a few drops of the sample.
****Technical Information No. 1204, Degussa AG The dispersing time and the volume of grinding medium are identical in each of Examples 1, 2, 3 and 4.

In inventive Example 4 the amount of fumed silica is present in more concentrated form, so that for the same dispersing effort a volume of clearcoat material greater by 5.8 times can be produced.

The invention claimed is:

1. Dispersion of fumed silica, comprising a silanized, structurally modified fumed silica and a solvent, wherein the fumed silica has the following size distribution:
   20% to 98% by weight in the range from 0.01 μm to 1.5 μm
   2% to 80% by weight in the range from 1.5 μm to 4.0 μm.

2. Dispersion of fumed silica according to claim 1, further comprising one or more additives.

3. Process for producing solventborne coating materials, comprising mixing the dispersion according to claim 1 with at least one binder.

4. Process according to claim 3, further comprising adding at least one curing agent.

5. Dispersion of fumed silica according to claim 1, wherein the fumed silica is present in the amount of 5% to 70% by weight of the dispersion.

6. Dispersion of fumed silica according to claim 1, wherein the silanized, structurally modified fumed silica has a surface with dimethylsilyl and/or monoethylsilyl groups attached thereto.

7. Dispersion of fumed silica according to claim 1, wherein the fumed silica is further characterized by:

| | |
|---|---|
| BET surface area | 25-400 |
| Average primary particle size nm | 5-50 |
| pH: | 3-10 |
| Carbon content % by weight | 0.1-10 |
| DBP value % | <200. |

8. Dispersion of fumed silica according to claim 1, wherein the fumed silica has the following size distribution:
   60% to 95% by weight in the range from 0.2 μm to 1.5 μm
   5% to 40% by weight in the range from 1.5 μm to 3.5 μm.

9. Dispersion of fumed silica according to claim 1, wherein the solvent is an organic solvent.

10. Non-water soluble coating composition comprising the dispersion according to claim 1 and at least one curing agent and/or at least one binder.

11. A clear coat material comprising the dispersion according to claim 1.

* * * * *